July 25, 1939.  L. L. WEST  2,167,470
AUTOMATIC COLLATOR
Filed Dec. 4, 1937  12 Sheets-Sheet 1
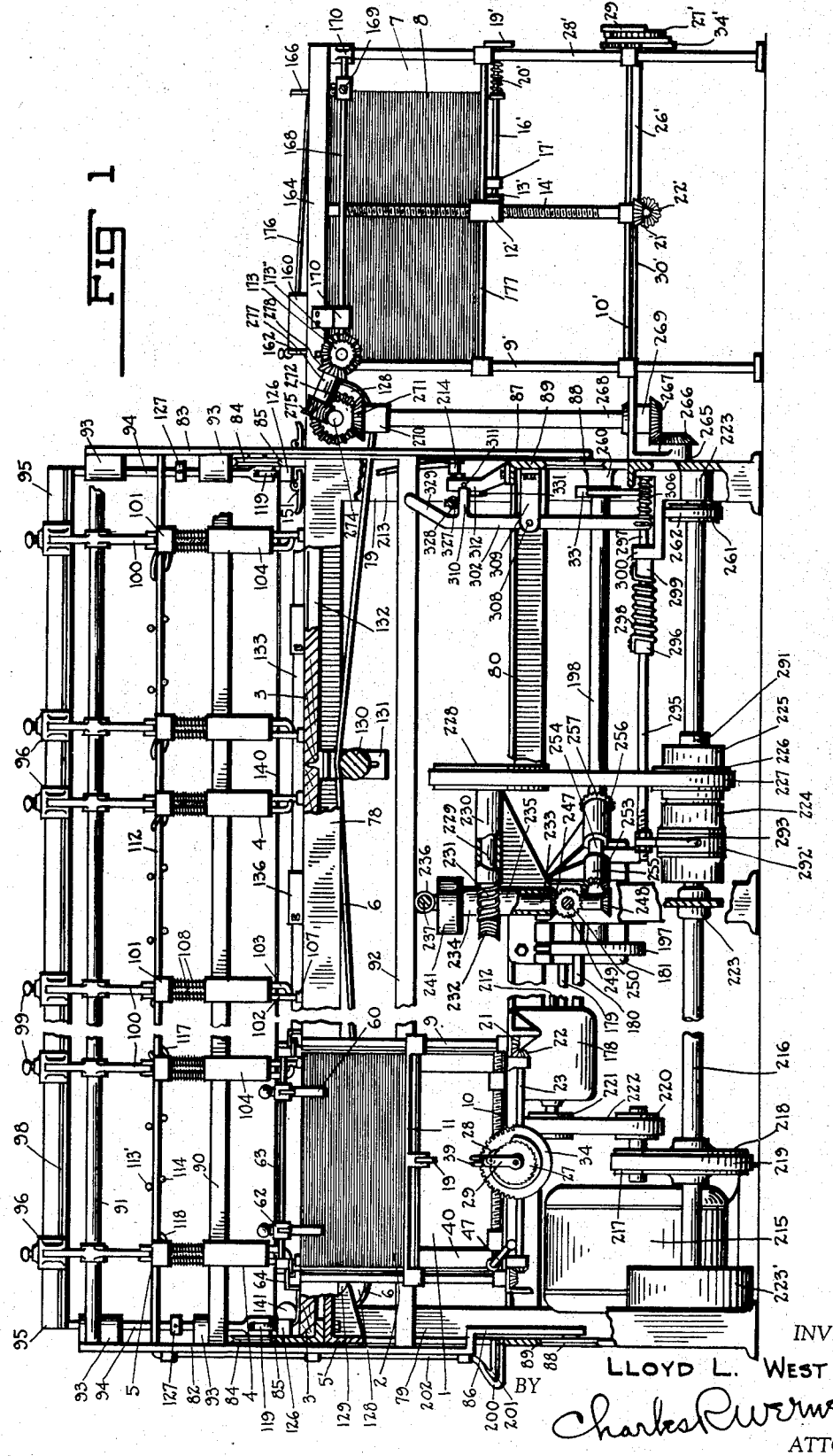
INVENTOR.
LLOYD L. WEST
BY Charles R. Werner
ATTORNEY.

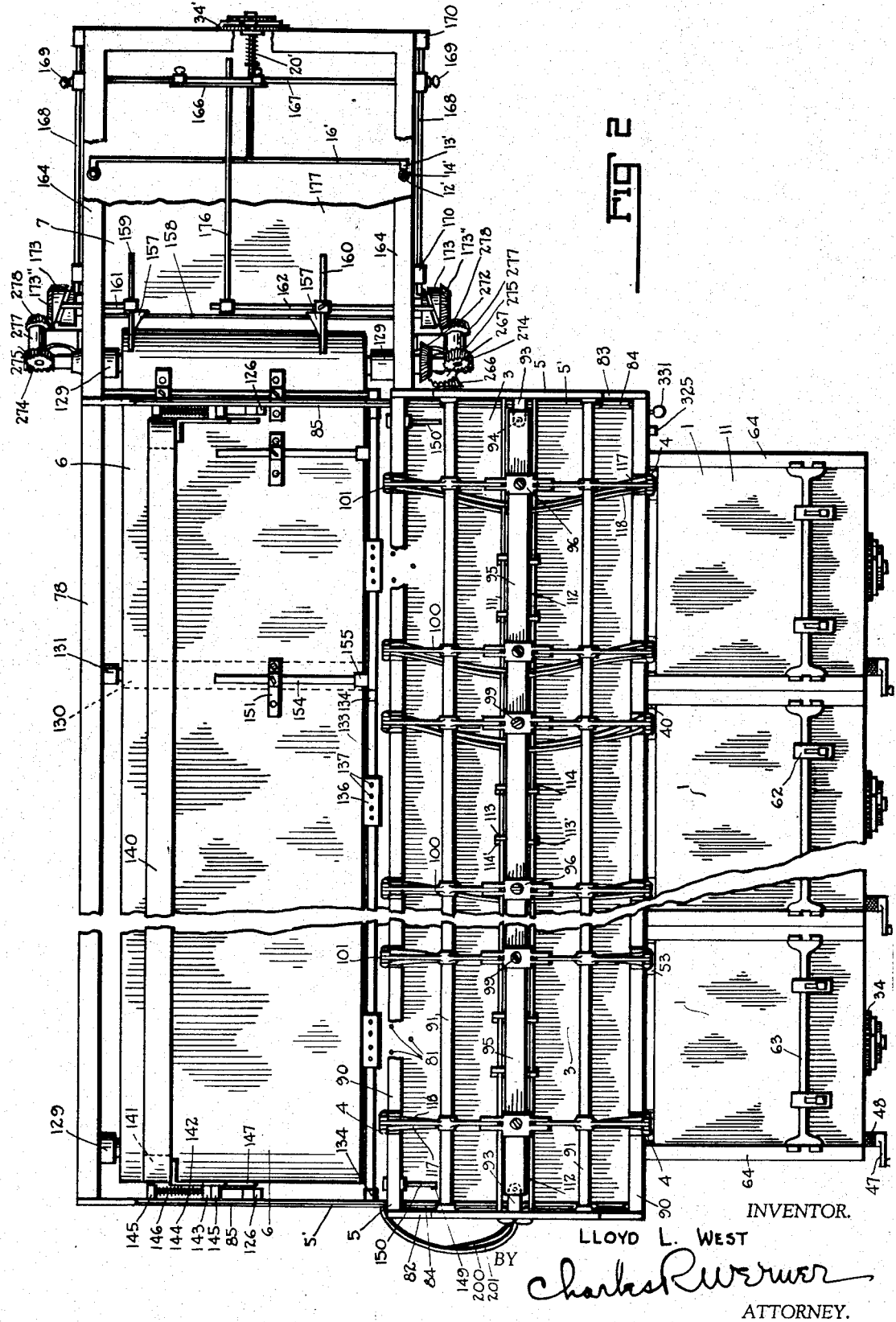

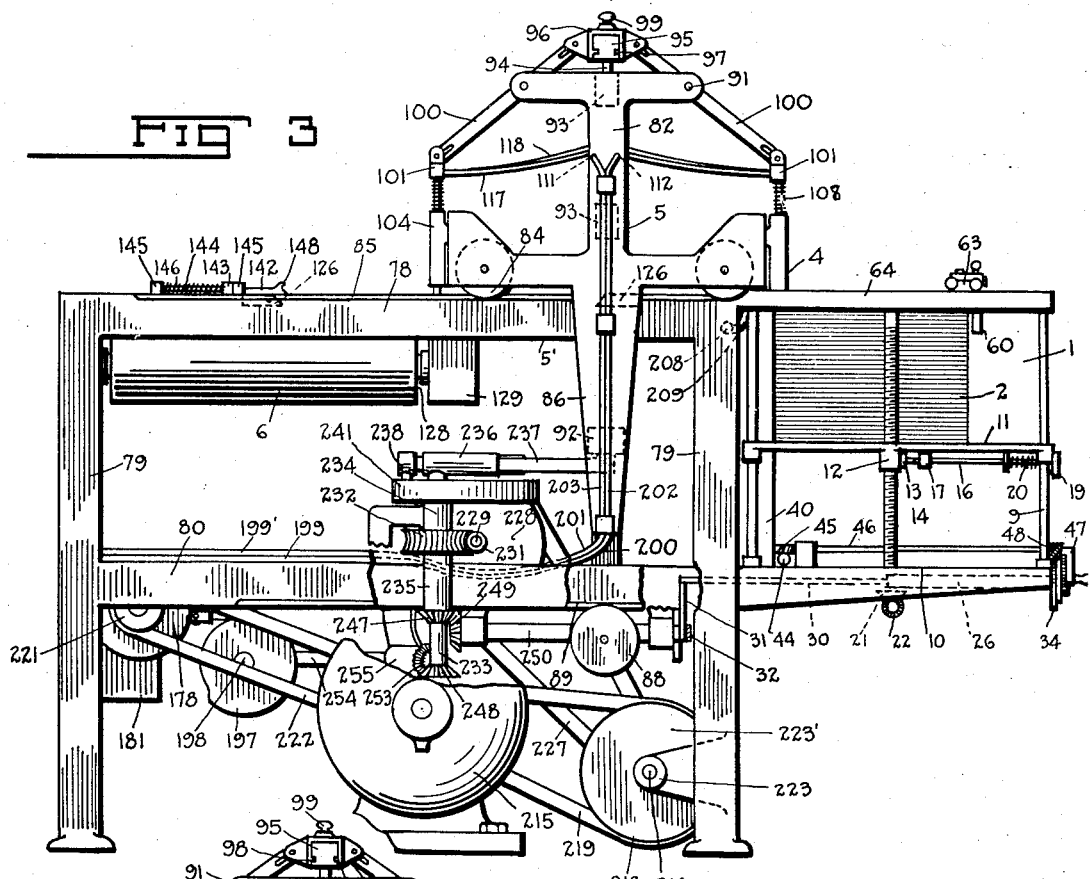

July 25, 1939.  L. L. WEST  2,167,470
AUTOMATIC COLLATOR
Filed Dec. 4, 1937    12 Sheets-Sheet 4
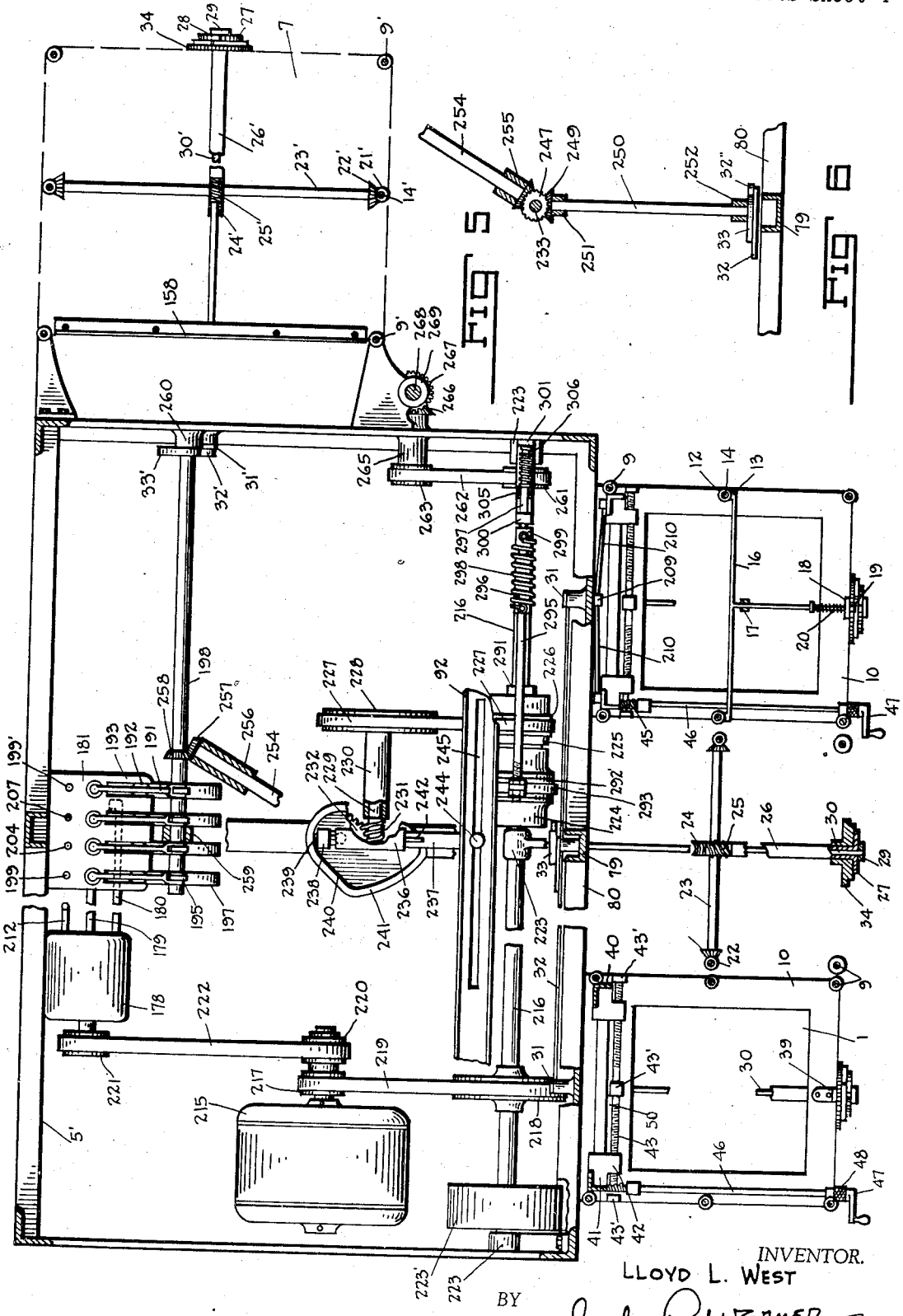
INVENTOR.
LLOYD L. WEST
BY Charles R Werner
ATTORNEY.

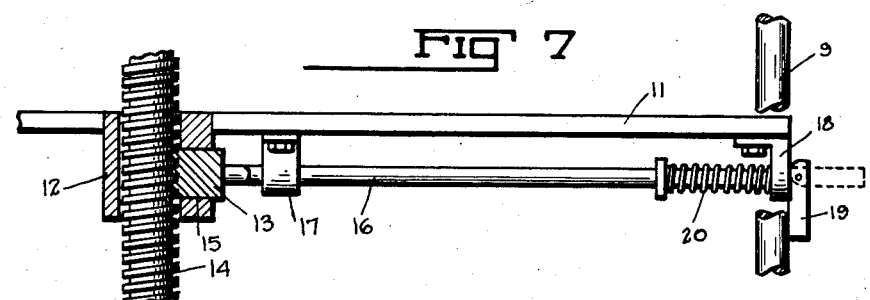
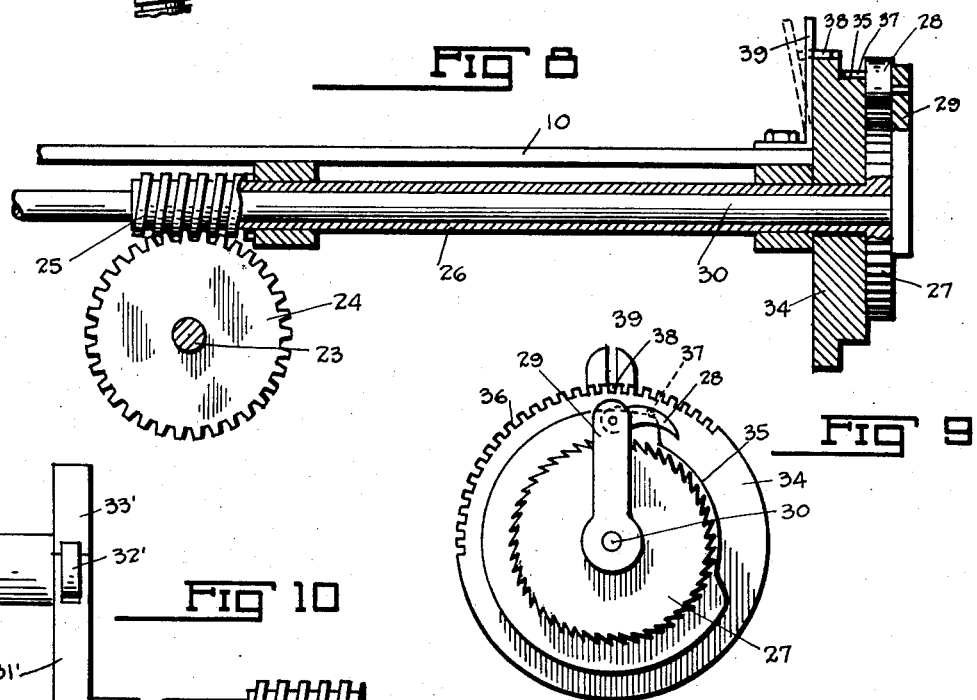
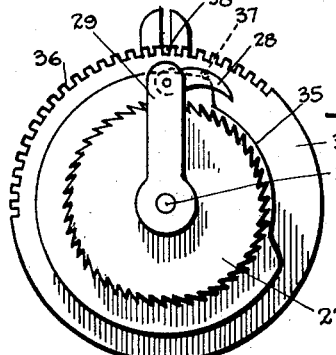
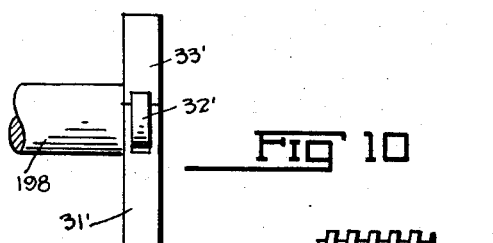
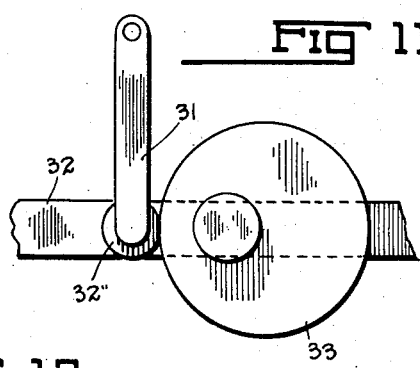
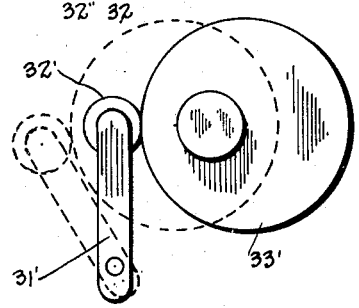

July 25, 1939.  L. L. WEST  2,167,470
AUTOMATIC COLLATOR
Filed Dec. 4, 1937    12 Sheets-Sheet 6
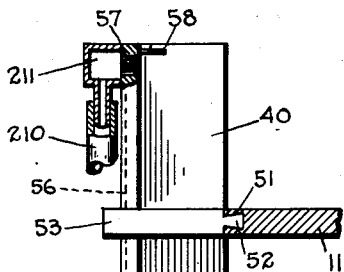
Fig 13
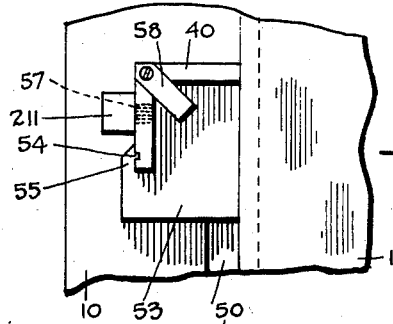
Fig 14
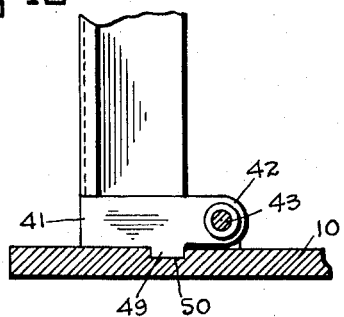
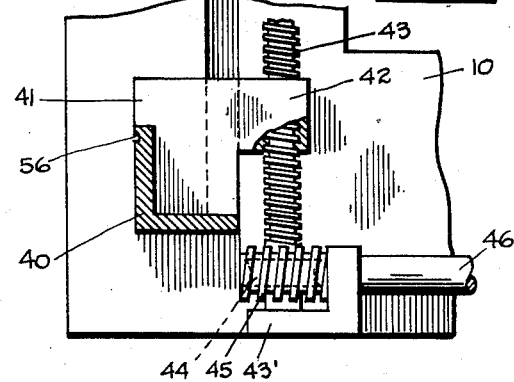
Fig 15
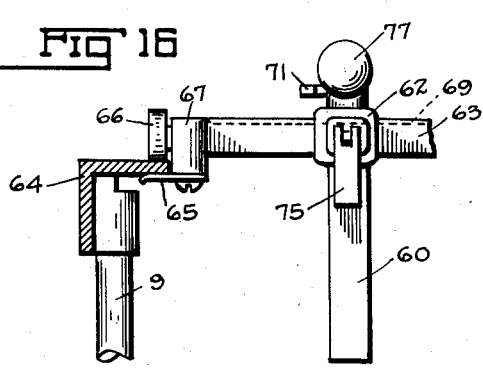
Fig 16
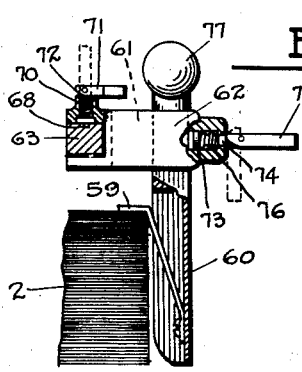
Fig 17
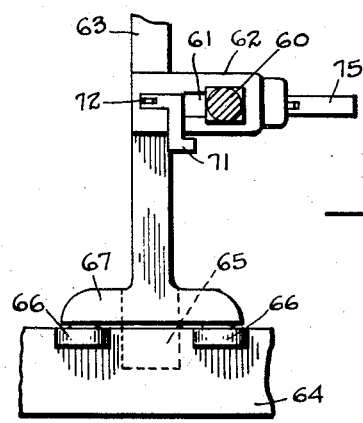
Fig 18
INVENTOR.
LLOYD L. WEST
BY Charles R. Werner
ATTORNEY.

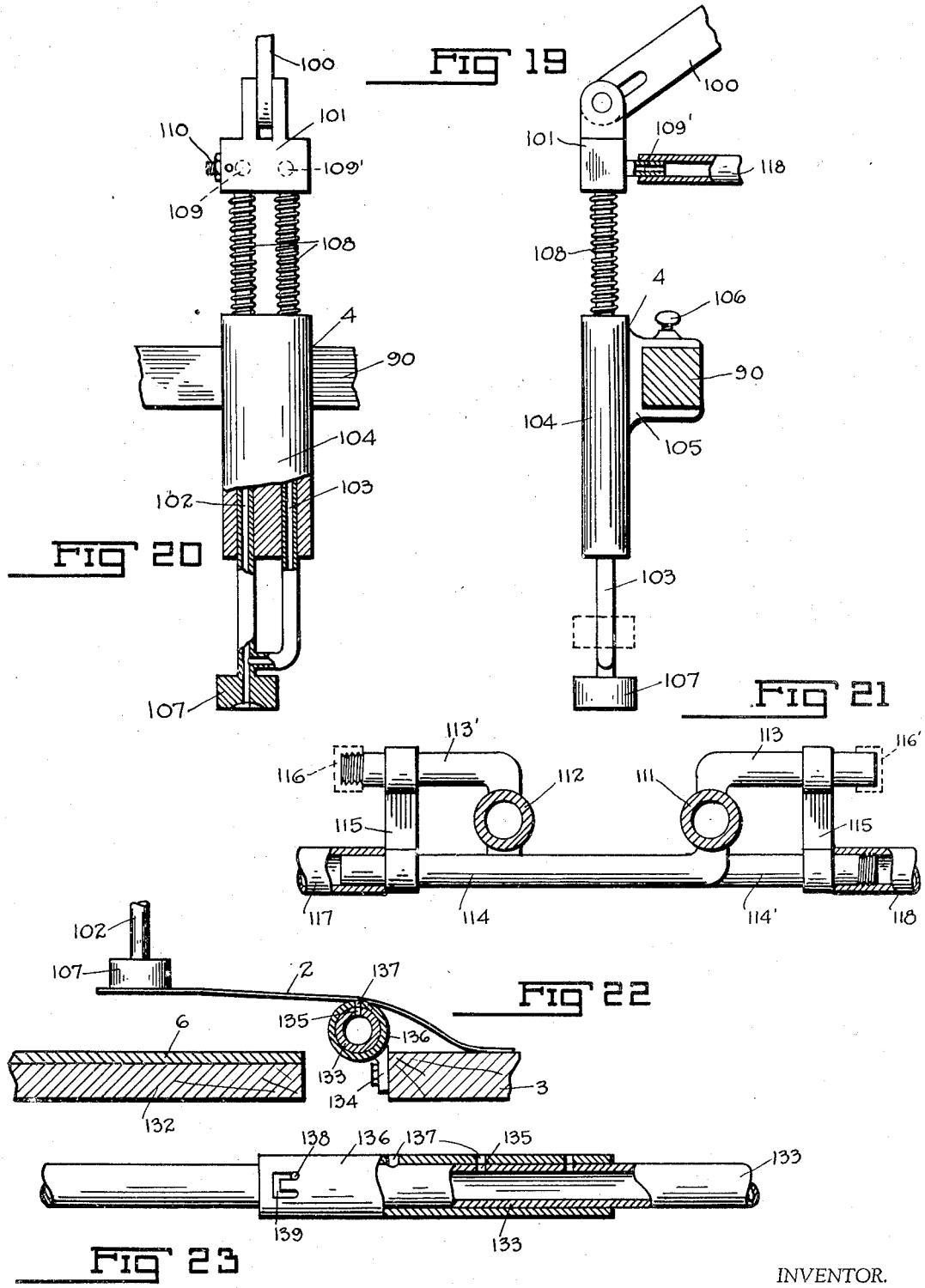

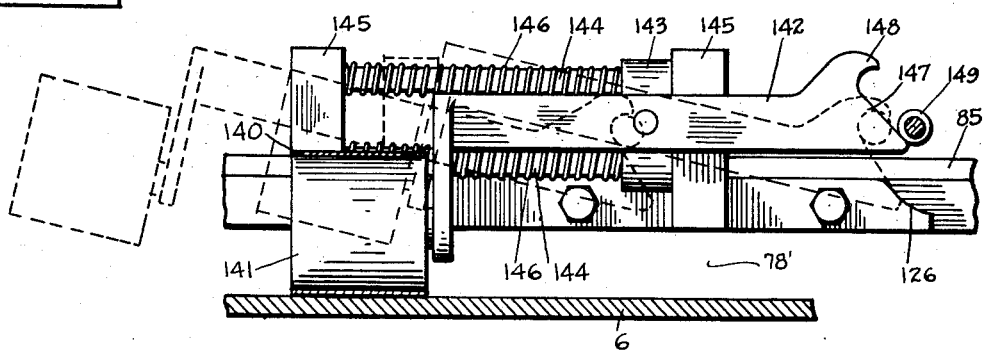
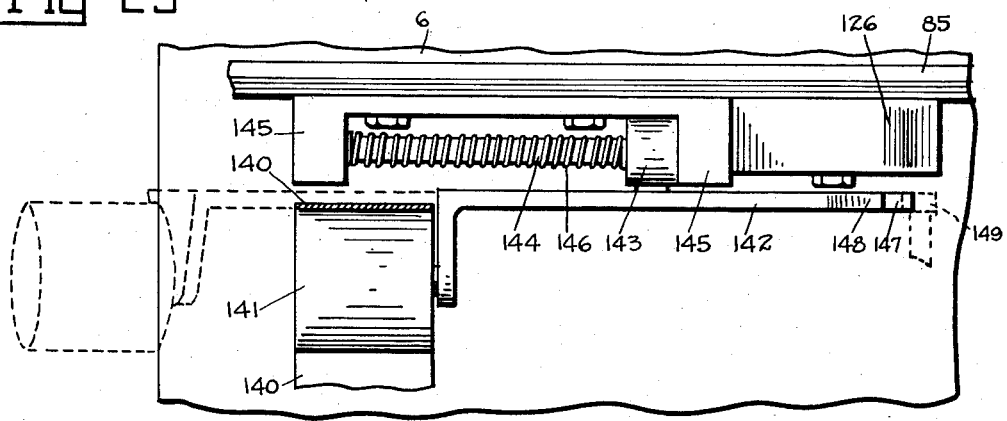
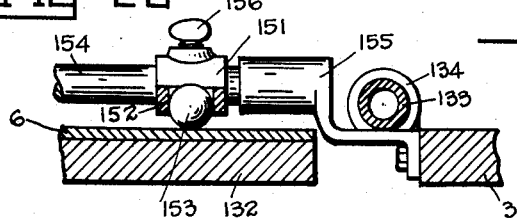
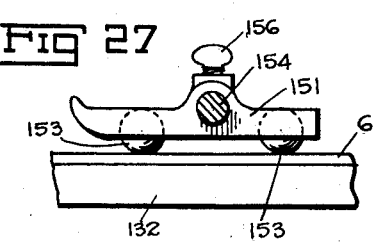
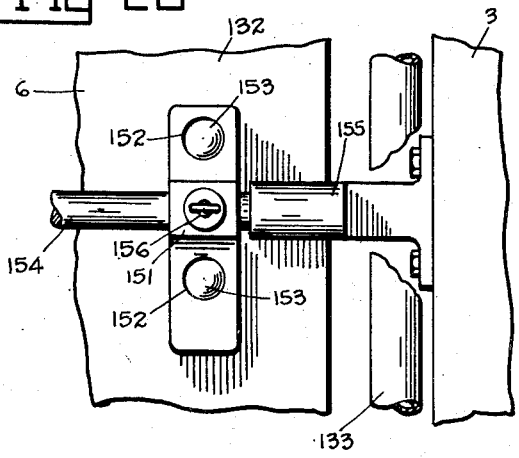
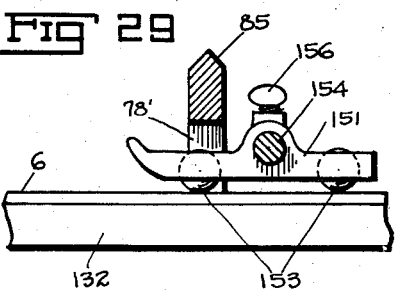

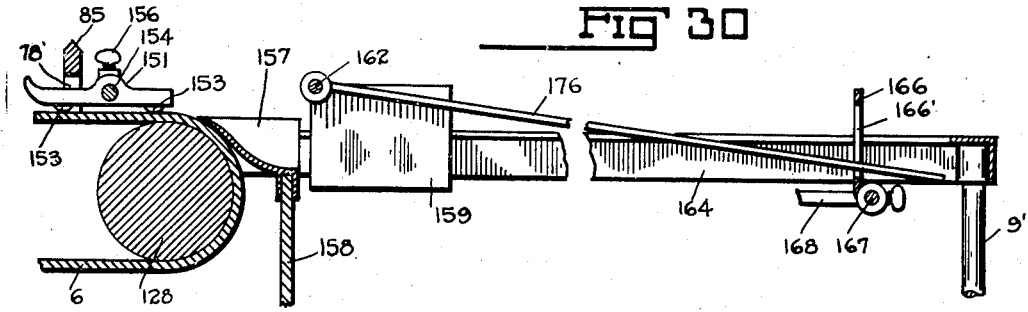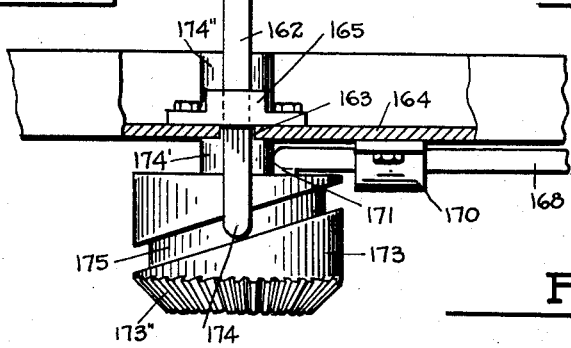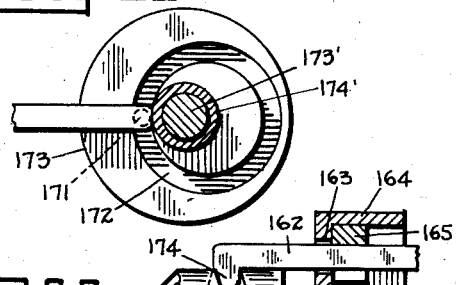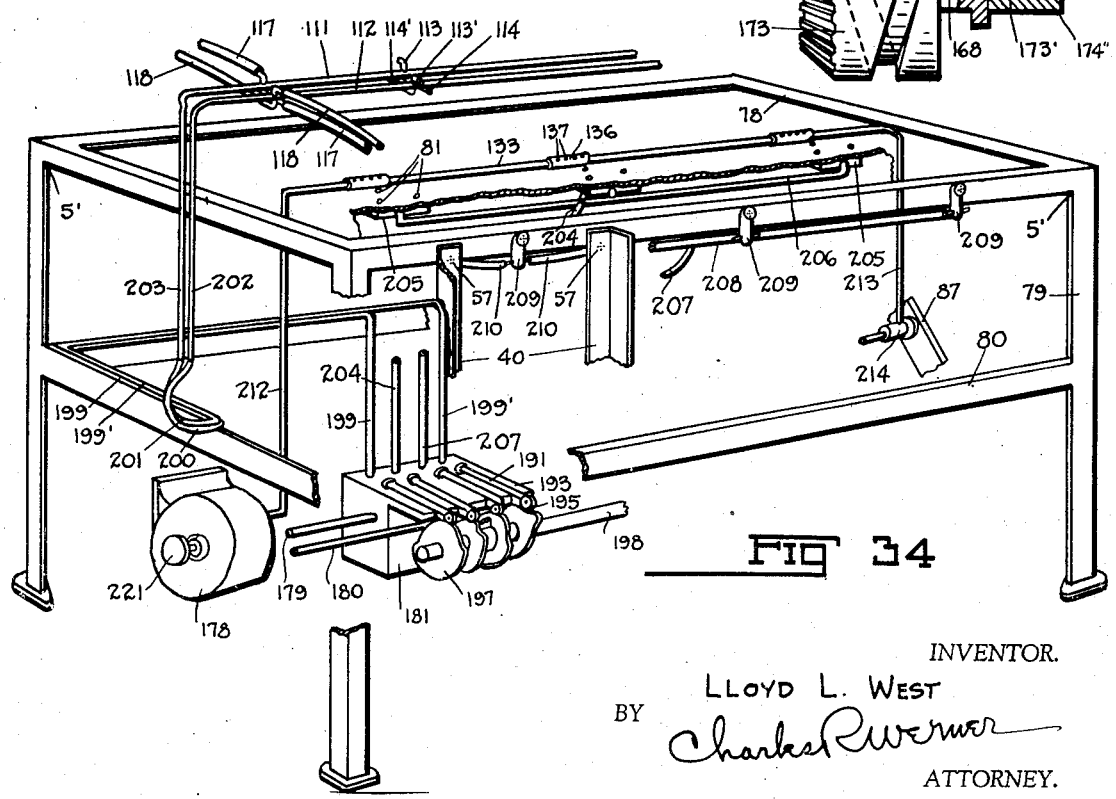

July 25, 1939.  L. L. WEST  2,167,470
AUTOMATIC COLLATOR
Filed Dec. 4, 1937    12 Sheets-Sheet 10
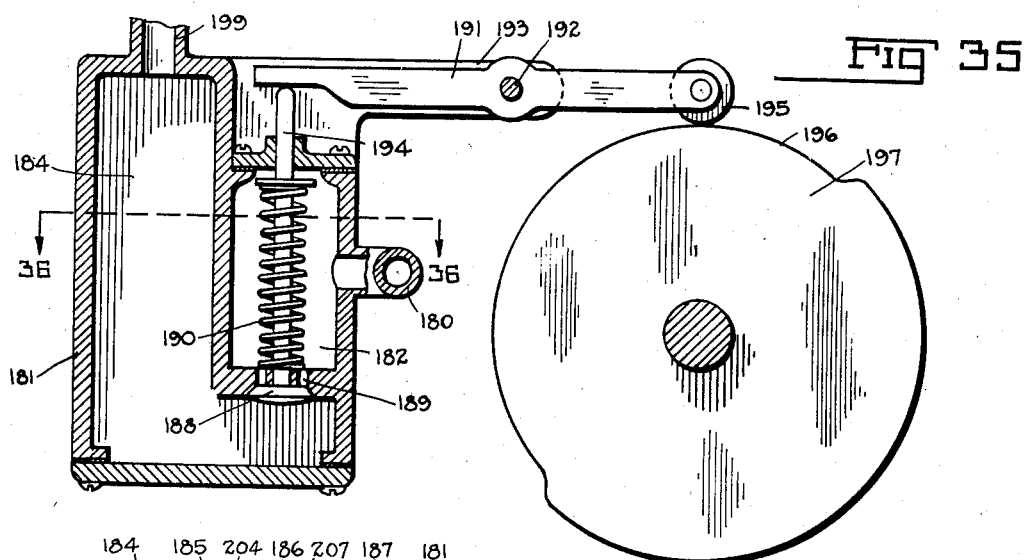
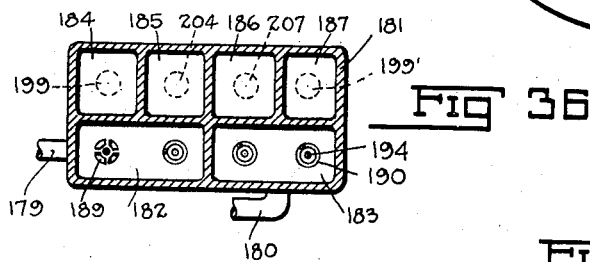
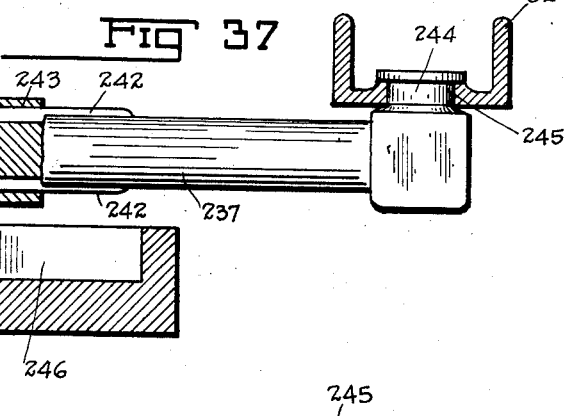
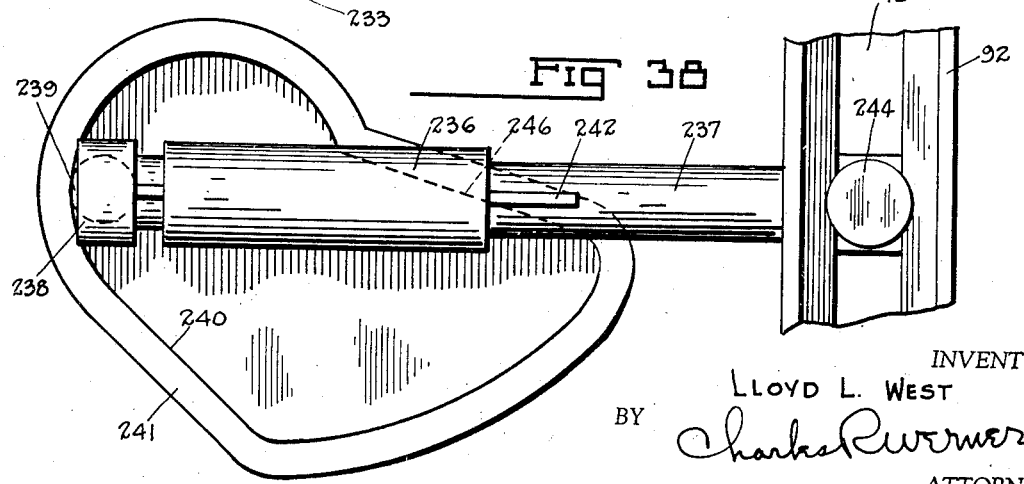
INVENTOR.
LLOYD L. WEST
BY Charles R. Werner
ATTORNEY.

July 25, 1939.   L. L. WEST   2,167,470
AUTOMATIC COLLATOR
Filed Dec. 4, 1937   12 Sheets-Sheet 11
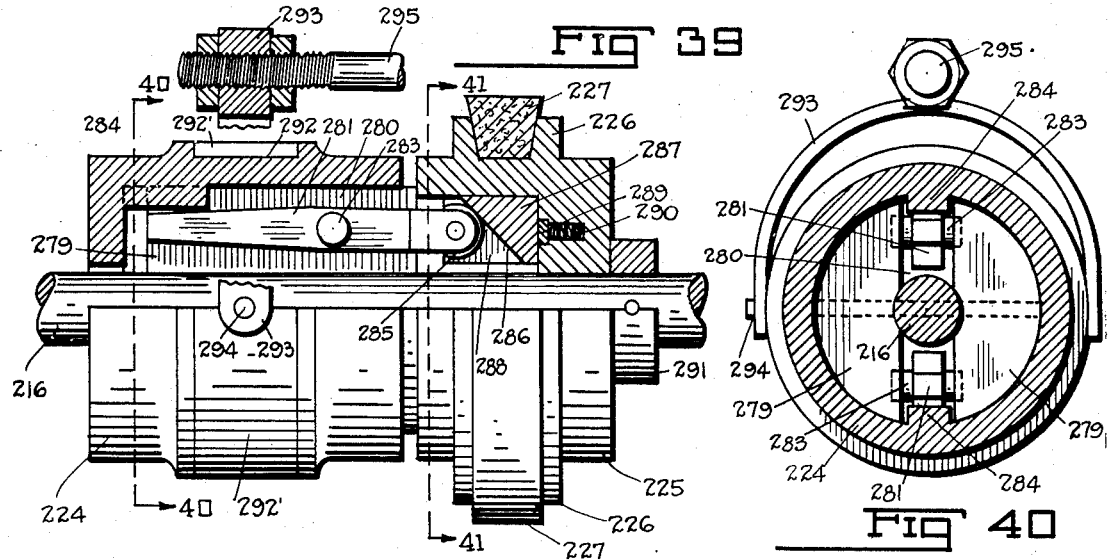
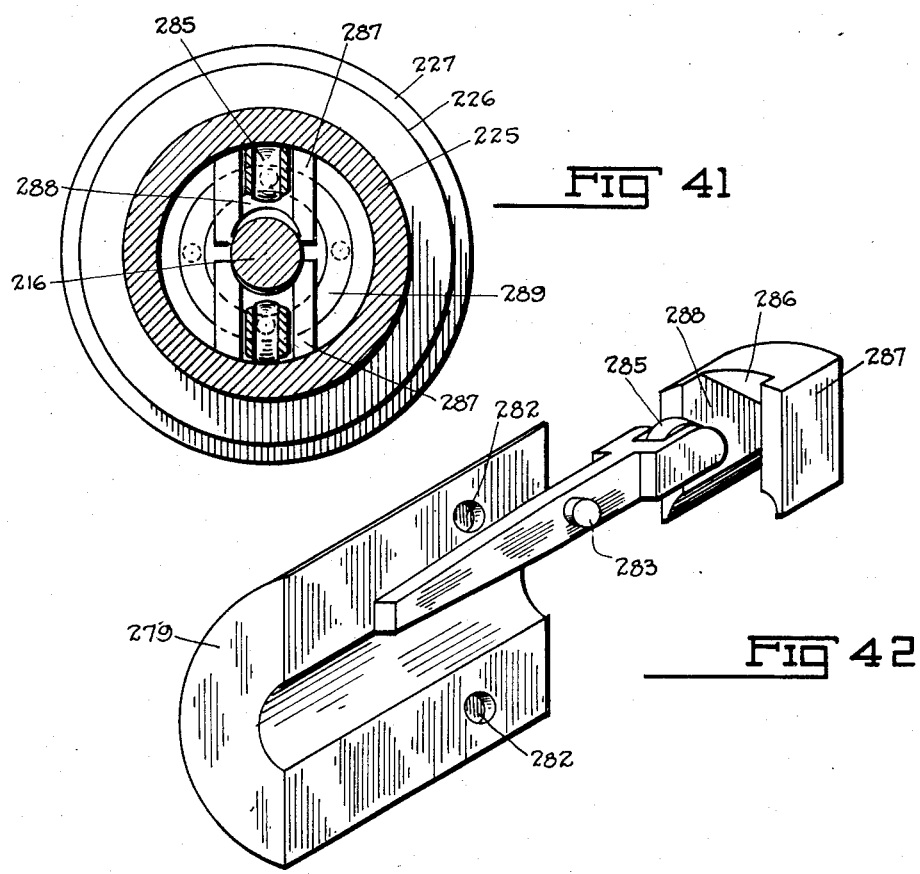
INVENTOR.
LLOYD L. WEST
BY Charles R. Werner
ATTORNEY.

July 25, 1939.　　　　L. L. WEST　　　　2,167,470
AUTOMATIC COLLATOR
Filed Dec. 4, 1937　　　12 Sheets-Sheet 12
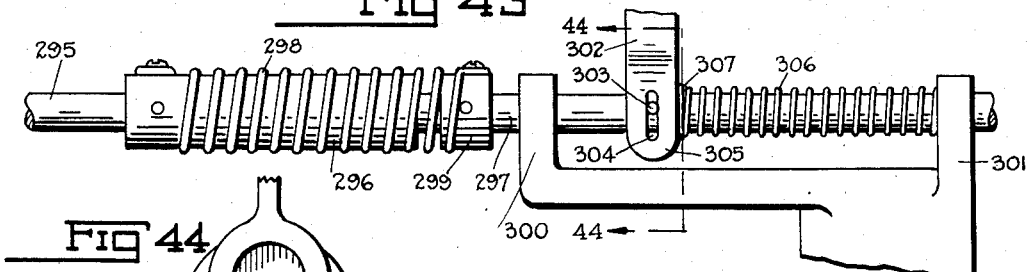
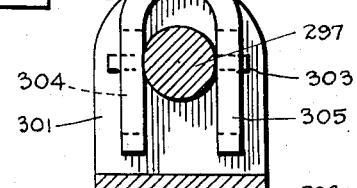
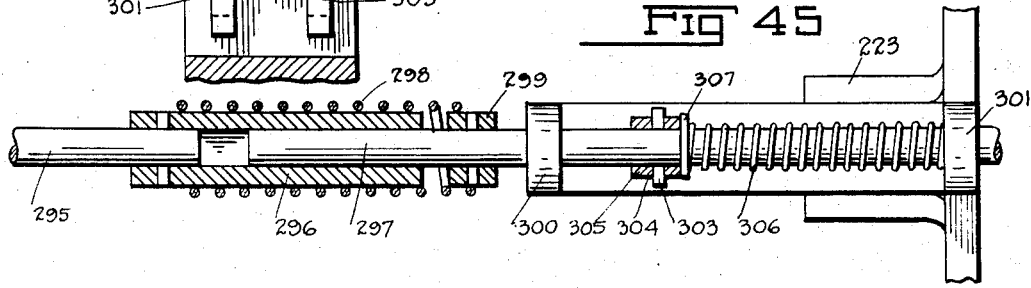
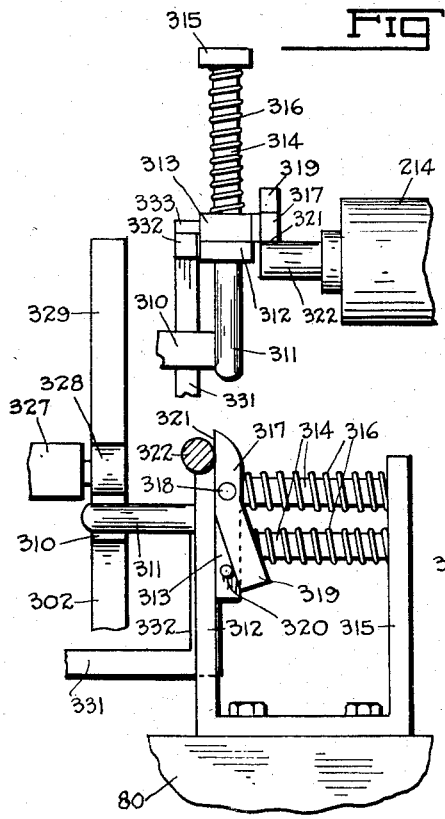
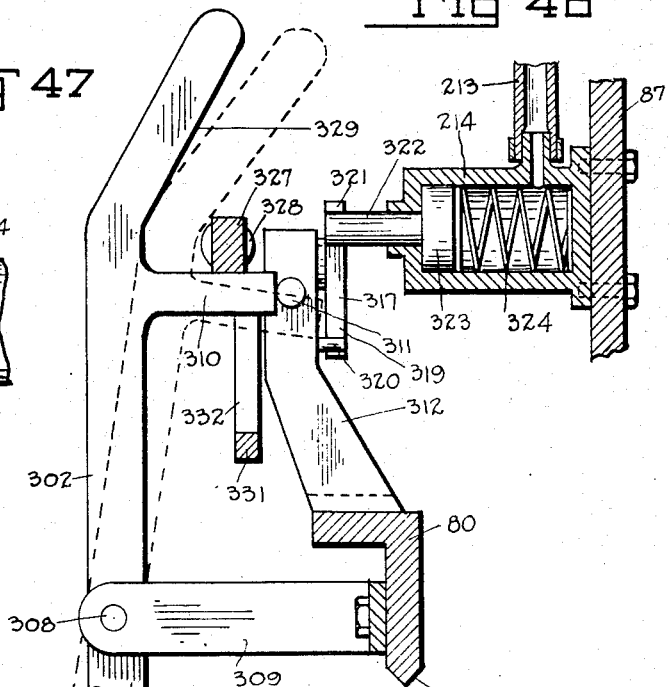
INVENTOR.
LLOYD L. WEST
BY Charles R. Werner
ATTORNEY.

Patented July 25, 1939

2,167,470

UNITED STATES PATENT OFFICE 2,167,470

AUTOMATIC COLLATOR

Lloyd L. West, Wichita, Kans., assignor of forty-nine per cent to John B. McKay, Wichita, Kans.

Application December 4, 1937, Serial No. 178,078

30 Claims. (Cl. 270—58)

This invention relates primarily to gathering or assembling machines, known as collators, and particularly to an automatic collator for use in assembling various sheets of paper or the like in a predetermined order.

There is in use today, in business and in other fields, many different paper forms in which a plurality of sheets are used in consecutive order, that is, an original, duplicate, triplicate, quadruplicate, etc. Pages of pamphlets, magazines, books, catalogs and other printed matter, as well as colored papers for various purposes are just a few of the articles which must be bound, secured or assembled together in proper order. As far as I am aware, this procedure of assembling various sheets or pages in consecutive order has been until my invention a manual process, requiring much time and dependent on the human element for accuracy.

The objects of my invention are, first: to provide an automatic collator of the class described wherein single sheets from each of a plurality of feeder piles are simultaneously transferred to a delivery belt and ejected therefrom in consecutive order preparatory to binding, securing or assembling together.

Second: to provide in an automatic collator of the class described, a transfer table or intermediate step between the feeder piles and the delivery belt, the single sheets being deposited on the transfer table and held thereon by suction means, the sheets then being carried to the delivery belt; whereby, if the device fails to carry a sheet to the transfer table, it will be noted by the operator and the deficiency corrected.

Third: to provide in an automatic collator of the class described, an automatic feeder mechanism which may be supplied with a plurality of sheets and periodically raised to maintain the top sheet at pickup position and provided with blast means to agitate the top sheet to facilitate pick up thereof.

Fourth: to provide in an automatic collator of the class described, employing feeder mechanism, manually operated adjustable paper stops for properly positioning the paper in the feeders.

Fifth: to provide in an automatic collator of the class described, pickup mechanism adapted to pick up a single sheet of paper and carry it to the next stage, release it and return for another sheet.

Sixth: to provide in an automatic collator of the class described, pickup mechanism adjustable to the size of sheet with which used.

Seventh: to provide in an automatic collator of the class described, pickup mechanism having suction and blast means whereby the suction will be used in picking up and holding a sheet of paper during transfer to the next stage and the blast means will operate to release the paper from the pickup member.

Eighth: to provide in an automatic collator of the class described, a suction means adapted to prevent the moving sheet from dragging on the delivery belt until final deposit thereon and means for shutting off the suction openings which are not in use.

Ninth: to provide in an automatic collator of the class described, hold down mechanism cooperable with the delivery belt for retaining the sheets on said delivery belt, said hold down mechanism being movable off the delivery belt and out of the way of the pickup members during their deposit of sheets on the delivery belt, the hold down members being adapted to automatically return to paper hold down position.

Tenth: to provide in an automatic collator of the class described, auxiliary hold down shoes in constant engagement with the delivery belt for securely holding the sheets in close relation to said belt, said shoes being adjustable for different size sheets.

Eleventh: to provide in an automatic collator of the class described, means for removing the sheets from the delivery belt and depositing said sheets on a delivery or receiving table.

Twelfth: to provide in an automatic collator of the class described, means at the delivery station for "jogging" or agitating the delivered sheets to facilitate and assure even piling thereof.

Thirteenth: to provide in an automatic collator of the class described, automatic delivery table dropping means for lowering the table as sheets are delivered thereon, including means for adjusting the rate of downward movement of the table according to the thickness and number of sheets being collated.

Fourteenth: to provide in an automatic collator of the class described, an air system including a pump, a valve chamber, a plurality of blast and suction lines, valves in the chamber valving the lines, and cams for actuating the valves, the lines being carried to various parts of the machine for air operation thereat, the cams actuating the valves properly timing the suction and blast at the desired points.

Fifteenth: to provide in an automatic collator of the class described, driving means for the pump, delivery belt and the joggers, said driving means also actuating the pickup mechanism, the feeder lifts, delivery drop and the valve cam shaft, a clutch being provided to isolate and stop the second group of mechanisms while allowing the first group to continue operation, and a manually operated lever for disengaging the clutch.

Sixteenth: to provide in an automatic collator of the class described, a clutch in the driving means and an automatic means for disengaging the clutch operable only when any of the pick up members fail to carry a sheet of paper across the suction means provided to prevent the moving sheet from dragging on the delivery belt.

Seventeenth: to provide in an automatic collator of the class described, release means in the feeder mechanism and in the delivery mechanism whereby the feeder tables and the delivery table may be released from the automatic lift or drop so that they may be raised or lowered manually to any desired position.

Eighteenth: to provide in an automatic collator of the class described having a pickup member carriage, a carriage actuator adapted to reciprocate the carriage, said actuator being adapted to move the carriage more rapidly from the delivery belt position than from the feeder position, whereby the hold down members may drop instantaneously onto the sheet on the moving belt to hold said sheet in place.

In carrying out the preferred form of my invention I employ a plurality of feeder stations in which are positioned the piles of sheets which are to be assembled, a plurality of like sheets in each of the respective feeders. Adjacent the feeder stations is the transfer table and running parallel with the transfer table is the delivery belt. A pickup carriage is adapted to move transversely of the machine and has two aligning sets of pickup members, one set being adapted to pickup sheets from the feeder piles and deposit them on the transfer table and the other set being adapted to pick up the sheets deposited on the transfer table and deposit them on the moving delivery belt, said belt moving at a rate sufficient to deposit all the sheets thereon at the delivery station positioned at the end of the belt, before another supply of sheets is deposited on the belt.

An air system is provided, employing suction and blast lines which are controlled by timed valves and connected at various points on the machine to facilitate the proper movement of the sheets therein. Blast is provided on the feeder stations to agitate the top sheets therein to assure proper pick up of same by the pick up shoes to which a suction line and a blast line are connected, the suction holding the sheets to the shoe and the blast removing the sheet when depositing on the transfer table or the delivery belt. Suction is provided on the transfer table to hold the sheets thereto after deposit from the feeder and until the pickup members drop thereon to remove them to the delivery belt. Suction is also provided on a longitudinal tube between the transfer table and the delivery belt, this tube and the suction therein providing means for holding the sheet taut and free from the delivery belt during transit from the transfer table to the delivery belt for deposit thereon.

A hold down tape is provided running parallel with the delivery belt and at one edge thereof, this tape being adapted to retain the sheets against the delivery belt during their movement thereon. The hold down tape is so mounted that at the last part of the stroke of the pickup members carrying the sheets to the delivery belt, the hold down tape will be raised from the delivery belt and forced away therefrom so that the pick up members may deposit the sheets on the belt at the far edge thereof. Immediately on return movement of the pickup members the hold down tape will return to sheet retaining position. Adjustable hold down shoes are also provided, resting on the delivery belt, between which shoes and the belt, the sheets may pass.

A clutch and both a manual and an automatic throwoff therefor are provided in the driving mechanism. The automatic throwoff is actuated only when a sheet fails to be removed from the transfer station or table to the delivery belt. The manual throwoff is easily accessible to the operator and may be operated at will.

In the feeder stations means are provided for automatically raising the feeder tables as the supply of sheets thereon diminishes and in the delivery stations means are provided for automatically lowering the delivery table as the sheets accumulate thereon.

The objects, advantages, construction and operation of my invention will be better understood by reference to the following description in connection with the accompanying drawings in which:

Fig. 1 is a longitudinal, elevational, assembly view of the automatic collator comprising my invention.

Fig. 2 is a top plan assembly view of the same.

Fig. 3 is an end elevational assembly view from the drive end.

Fig. 4 is an end elevational assembly view from the delivery end.

Fig. 5 is a top plan view taken below the working top of the device showing the driving mechanism assembly.

Fig. 6 is a fragmentary detail view of the valve cam shaft drive and the feeder table lift cam drive.

Fig. 7 is an elevational view, partly in section, of the feeder lift screw release mechanism, the delivery drop screw release mechanism being similar in construction.

Fig. 8 is a longitudinal, sectional view through the feeder table lift mechanism, the same construction being used in the delivery table drop mechanism except that reverse action is used.

Fig. 9 is an elevational view of the adjustment, cam, and pawl and ratchet members used in the feeder table lift and the delivery table drop mechanisms.

Fig. 10 is a fragmentary, side elevational view of the drive cam and rocker arm, shaft and worm and gear on the delivery table drop mechanism.

Fig. 11 is an end view of the drive cam and rocker arm for the feeder table lift mechanism, with a fragment of the rocker arm connecting member.

Fig. 12 is an end view of the drive cam and rocker arm for the delivery table drop mechanism.

Fig. 13 is a vertical elevation of the feeder back stops, parts being shown in section.

Fig. 14 is a top plan view of the same.

Fig. 15 is a sectional view through one of the feeder back stops, part of the adjustment therefor being shown.

Fig. 16 is a detail view of the front sheet retainer and bar, associated parts being shown in section.

Fig. 17 is a sectional view through the bar and retainer, parts being shown in elevation.

Fig. 18 is a fragmentary top plan view of the retainer, the retainer bar end and rollers, parts being shown in section.

Fig. 19 is a vertical side elevational view of the pickup member assembly.

Fig. 20 is a vertical front elevational view of the same, parts being shown in section.

Fig. 21 is a detail view of the suction and blast outlets on the pickup carriage.

Fig. 22 is a fragmentary, sectional view through the transfer table, delivery belt and suction line for holding the sheets in spaced relation to the delivery table, a portion of the pickup member being shown in elevation.

Fig. 23 is a longitudinal, sectional view, partly in elevation, through the sheet elevating suction line and the shutoff sleeve therefor.

Fig. 24 is a side elevational view of the hold down tape supporting mechanism.

Fig. 25 is a top plan view of the same.

Fig. 26 is a fragmentary, elevational and partly sectional view of the auxiliary hold down shoe; the transfer table, and delivery belt and table being shown in section.

Fig. 27 is a side elevational view of the same, the hold down shoe supporting rod being shown in section.

Fig. 28 is a top plan view of the same.

Fig. 29 is a cross sectional view and elevation of the auxiliary hold down shoe as used at the delivery end of the delivery belt.

Fig. 30 is a reduced side elevational view and section showing the auxiliary hold down shoe, the delivery belt, the strippers and the "joggers" and guides at the delivery station.

Fig. 31 is a fragmentary top plan view of the "jogger" actuating cam and associated rods, parts being broken away to better illustrate certain other parts.

Fig. 32 is an end view of the jogger cam from the cam groove side thereof.

Fig. 33 is a side elevational view of the jogger cam and associated parts, certain parts being shown in section.

Fig. 34 is a perspective, semi-diagrammatic view showing the air system.

Fig. 35 is a vertical sectional view showing the valve chamber assembly and cam actuator for the valves.

Fig. 36 is a reduced sectional view on the line 36—36 of Fig. 10.

Fig. 37 is an enlarged detail elevational view and section of the pickup carriage drive.

Fig. 38 is a fragmentary top plan view of the same.

Fig. 39 is a side elevational view, partly in section, of the clutch mechanism.

Fig. 40 is a sectional view on the line 40—40 of Fig. 39.

Fig. 41 is a sectional view on the line 41—41 of Fig. 39.

Fig. 42 is a disassociated perspective view of the clutch arm, shoe and arm support segment.

Fig. 43 is a fragmentary side elevational view of the clutch release shaft assembly.

Fig. 44 is a sectional view on the line 44—44 of Fig. 43.

Fig. 45 is a top plan and sectional view through the clutch release shaft assembly.

Fig. 46 is a front elevational view and sectional view of the clutch release shaft lever, the automatic suction valve and trip therefor, and the manual clutch release finger.

Fig. 47 is a fragmentary top plan view of the same.

Fig. 48 is a fragmentary side elevational view of the clutch release shaft lever and trip mechanism therefor, and the manual clutch release finger.

Referring now to the drawings by numerals of reference 1 designates the feeder station in which a quantity of sheets 2 may be placed. The top sheets are on a level with the transfer table 3 to which they are carried individually by the pickup members 4, carried by pickup carriage 5, movably positioned on frame 5'. A delivery belt 6 runs parallel with the transfer table 3 and terminates at a delivery station 7 in which the sheets are piled as shown at 8. Suitable driving mechanism is provided for actuating the various moving parts. An air system is also provided whereby suction and blast may be had at desired points and intervals in the operation of the device.

The feeder stations 1 comprise standards or uprights 9 carrying in fixed relation a lower frame 10 and in sleeved relation a movable table 11 having collars 12 with segment 13 in threaded engagement with screw shaft 14, whereby rotation of said shaft 14 in a predetermined direction will cause the table 11 to move upwardly to maintain the top sheets at pick up level. The table 11 may be disassociated from the shaft 14 and manually raised or lowered to any desired level by withdrawing the segment 13 working in the slotted opening 15 of the collar 12. (See Fig. 7.) A rod 16 is secured to the segment 13 and supported in bearings 17 and 18. The end of the rod 16 terminates in a pivoted lever 19, upward movement of which will cause endwise movement of the rod 16 to withdraw the segment 13 from engagement with the screw shaft 14. A spring 20 will return the segment to operating position when the lever 19 is lowered.

The automatic paper feeding mechanism of which the screw shafts 14 are a part, comprises gears 21 on the lower end of said screw shafts, said gears 21 engaging gears 22 on a cross shaft 23 suitably carried by the lower frame 10, the screw shafts being right and left hand since they must rotate in opposite directions. Centrally located on the cross shaft 23 is another gear 24 meshing with worm 25 carried by sleeve shaft 26 suitably carried by frame 10. (See Figs. 8 to 12.) The sleeve shaft 26 carries at the end thereof a ratchet wheel 27 actuated by movement of pawl 28 pivoted on lever arm 29 carried by shaft 30 passing through the interior of sleeved shaft 26 and terminating with a depending lever 31 in the case of the feeder lift and an upstanding lever 31' in the delivery drop mechanism, the dotted lines in Fig. 10 indicating the lever 31. The levers 31 on each of the feeders are interconnected by connecting rod 32 which carries a roller 32" adapted to be contacted by cam 33, actuation of which will be taken up hereinafter. The lever 31' carries a roller 32' adapted to contact cam 33', the actuation of which will also be hereinafter described.

Loosely carried by the sleeve shaft 26 is the cam and adjustment member 34, having cam surface 35 and toothed portion 36. A pin 37 on pawl 28 is adapted to ride the cam surface 35 and the relation between the pawl and the cam surface is adjustable by rotating the member 34 and maintaining same in adjusted position by the detent 38 on resilient member 39 carried by lower frame 10. The position of the cam in respect to the pin on pawl 28 will determine the moment of contact of the pawl with the ratchet wheel 27 consequently determining the amount of lift imparted to the feeder table 11. The feeder table lift may thus be adjusted for different thicknesses of sheets.

At the back end of the feeder stations, that is, adjacent the transfer table (see Figs. 13, 14 and 15), are located the feeder back stops comprising upright angular members 40 having a base portion 41 with threaded extension 42 in threaded engagement with screw 43. Suitable supports 43' are provided for said screw which carries at one end thereof a gear 44 engaged by a worm 45 on shaft 46 suitably supported on lower table 10 and carrying a crank 47 at the front end of the feeder table, a lock nut 48 being provided to lock the shaft 46 in fixed position. Right and left hand threads may be provided on the screw 43 so that rotation of said screw will cause the back stops 40 to move toward or away from each other for adjustment to fit the size sheet used. A projection or tongue 49 depends from the base portions 41 and is positioned in groove 50 in lower table frame 10 to keep the angular back stops 40 in horizontal alignment during adjustment. The movable feeder table 11 is grooved at 51 to carry dovetail 52 of table segment 53 whereby said segment may maintain its vertical relation to table 11 while being adjusted horizontally therewith. The projection 54 on extension 55 of segment 53 works in vertical groove 56 of back stop angle 40 so as to retain said segment in horizontal relation therewith while being adjusted vertically. It is on these segments 53 that the corners of the sheets lie.

In the back stop members 40 at the top of the pile of sheets in the feeder station are openings 57 through which a blast of air may be directed to loosen up the few top sheets in order to facilitate removal of same and to assure the transfer of only one sheet at a time. A small corner paper stop 58 may be provided to prevent the sheets from being raised too high by the air blast. The air system will be explained more in detail later in this specification.

Front sheet stops or aligners (see Figs. 16, 17 and 18), are provided in the feeder stations and comprise resilient fingers 59 which may rest against the top sheet and are carried by vertically slidable supports 60 received in slotted opening 61 of head 62, said head being adjustably carried on transverse bar 63 which may be rollingly mounted on feeder top frame 64, a resilient member 65 providing pressure against the frame 64, the rollers 66 being carried on T-head 67 of transverse bar 63. By this means the transverse bar 63 and the associated stops thereon may be adjusted on the top frame 64 to proper position in relation to the sheets being collated. The head 62 is maintained in adjusted position with relation to the transverse bar 63 by means of lock member 68 urged into contact with groove 69 in transverse bar 63 by spring 70. Latch or lever 71 pivoted to shaft 72 will raise member 68 when moved to a vertical position as will be obvious from the drawings. The slidable supports 60 may be maintained in fixed relation to the head 62 by lock members 73 on shaft 74 to which is pivoted lever 75, spring 76 normally urging the lock member 73 into locking position. When it is desired to have the slidable support move freely in slotted opening 61, the lock member is held in disengaging position as shown, allowing the support 60 to rise vertically when the bottom thereof contacts the feeder table 11. A weight 77 may be employed to assure gravitating of the sliding support 60.

The transfer table 3 to which the sheets 2 from the feeder stations are transferred prior to removal to the delivery belt, is supported on frame 78 and standards 79 with intermediate rails or brace members 80. (See Figs. 1 to 5.) Air suction openings 81 are provided in the face of the transfer table. (See Figs. 2 and 34.)

The pickup carriage 5, which is movable transversely across the transfer table to carry sheets from the feeder piles to the transfer table and from the transfer table to the delivery belt, comprises end frames 82 and 83 having V-rollers 84 riding on tracks 85 which form a part of the frame 78 at the ends thereof. Arms 86 and 87 depend from the end frames 82 and 83 and carry auxiliary V-rollers 88 riding track 89 of intermediate rails 80 assisting in stabilizing the pick up carriage in its back and forth movement.

The end frames 82 and 83 are interconnected by pickup head supports 90 and pickup head rocker arm supports 91 above the table and by connecting drive bar 92 below the table. The pick up carriage end frames 82 and 83 are provided with sleeve bearings 93 in which are movably positioned uprights or push rods 94 interconnected by rocker arm actuator bar 95 on which rocker arm pivot heads 96 are adjustably supported. Projections 97 on the rocker arm pivot heads slide in grove 98 in the rocker arm actuator bar 95, a suitable thumb screw 99 being provided to lock the head 96 in adjusted position. Slidably pivoted to the head 96 are pickup rocker arms 100 which are sleeved for pivotal movement on pick-up head rocker arm supports 91, the other end of the rocker arms being slidably pivoted to pickup cross head 101 (see Figs. 19 and 20), having rigid depending conduits or hollow rods 102 and 103 which are sleeved for vertical movement in tube carrier 104, a clamp 105 and set screw 106 being provided for securely holding the carrier 104 in any desired position on the pick up head support 90. One tube 102 terminates in a suction cup 107 the other tube or hollow rod 103 being diverted at an angle and connecting with the first tube 102 above the suction cup 107. Springs 108 surround the hollow rods 102 and 103 between the cross head 101 and the tube or rod carrier 104 and normally urge the cross heads upward. Outlets 109 and 109' are provided on the cross heads 101 for connection to suction and blast lines. A valve 110 may be provided in the cross head 101 or in any other suitable position for adjustment of the suction in the rod 102. Longitudinal air suction and blast conduits 111 and 112 extend between the end frames 82 and 83 and are provided along the length thereof with spaced outlets as shown in Figs. 1 to 4 and 21. Each conduit 111 and 112 has a short upper outlet 113 and 113' extending outwardly, and a longer, lower outlet 114 and 114' extending inwardly crossing each other, clamps 115 being provided to tie the lower outlets to the upper outlets as shown. Screw caps and sleeve caps, 116 and 116' are provided on the blast and suction outlets which are not in use. Flexible conductors 117 and 118 extend from the outlets 113, 114, 113' and 114' to the outlets 109 and 109' on the cross heads 101.

The lower end of the push rods 94 carry rollers 119 (see Figs. 1 and 4), which are adapted to contact cams 126 secured to the sides of tracks 85, upward movement of the rods 94 by contact with the cams, raising the rocker arm actuator bar 95 to actuate the rocker arms 100 causing downward movement of the pick up suction cups 107 to pick up or deposit a sheet at the feeder station, transfer table, or delivery belt, as the case may be. When the rollers 119 are free of the cams 126, the springs 108 on the pick up heads will assist in urging the push rods downwardly, the extent of downward movement being limited by adjustable collars 127 on the push rods.

Running parallel to and adjacent the transfer table 3 is the delivery belt 6 carried by pulleys or rollers 128 suitably journaled in bearings 129. Idler roller 130 adjustably carried by supports 131 provides means for applying the proper tension to belt 6. (See Fig. 1.) A belt table 132 is positioned below the upper portion of belt 6 providing a solid base therefor. The upper portion of the belt passes through opening 78' in end frame 78. (See Fig. 4.)

On the transfer table 3, adjacent the delivery belt is a longitudinal suction conduit 133 (see Figs. 22 and 23), supported above the top of the transfer table and the delivery belt by suitable clamps 134, openings 135 being provided in the conduit at the top thereof, a sleeve valve 136 having corresponding openings 137, being adapted to close off said openings 135 when they are not in use. A pin 138 working in slot 139 is adapted to retain the sleeve 136 in open or closed position. As shown in Fig. 22 the sheet being carried by the pickup head from the transfer table to the delivery belt will be kept from dragging on the delivery belt, the suction in the conduit 133 assisting in keeping the sheet taut. The function of this conduit in connection with the automatic control means for stopping the machine, should a sheet fail to be carried from the transfer table to the delivery belt, will he hereinafter explained.

The sheets which are deposited on the moving delivery belt are held in place by the hold down tape 140 (see Figs. 24 and 25), carried on pulleys 141, rotatably secured to rocker arm 142 which in turn is pivotally mounted to sliding head 143, slidably mounted on rods 144, carried by brackets 145 which may be suitably fastened to the track 85. Springs 146 normally urge sliding head 143 and its associated rocker arm 142 and pulley and hold down tape into position above the delivery belt. The end of the rocker arm 142 opposite the pulley 141 has an inclined face or shoulder 147, the upper end of which has a hook or stop 148, a roller 149 being adapted to move in a horizontal line to contact the inclined surface to rock the rocker arm 142 raising the hold down tape from the delivery belt, further horizontal movement of the roller 149 causing it to engage the stop or hook 148 and thereby terminating the rocking action of the rocker arm but causing said arm and the sliding head 143 to move on the rods 144, carrying the hold down tape away from the delivery belt to allow deposit of sheets thereon. Upon retraction of the roller 149 the springs 146 will cause the hold down tape to return to its position above the belt and further retraction of the roller 149 will allow the hold down tape to drop onto the delivery belt to hold the sheets securely thereto. The roller 149 is shown carried by an arm 150 on the pick up head support 90 (see Figs. 2 and 4), but may be in any desirable position so as to actuate the hold down tape at a predetermined moment and in proper relation with the action of the other mechanism. Since the hold down tape is held at each end by rollers or pulleys 141, hold down tape actuating mechanism is provided at both ends of the tape and operated simultaneously upon movement of the pickup carriage 5.

To assist the hold down tape in retaining the sheets on the delivery belt I have provided auxiliary hold downs 151 (see Figs. 26 to 29), having openings 152 in which are freely carried balls 153 resting against the delivery belt, the sheets passing therebetween. The auxiliary hold downs 151 are adjustably carried by supporting rods 154 held by brackets 155 suitably secured to the transfer table 3. Set screws 156 are provided for securely locking the hold downs in adjusted position. The auxiliary hold downs are positioned on the delivery belt between each set of pick up heads so that they will not interfere with transverse movement of the pick up carriage.

At the delivery station end of the belt 6 (see Fig. 30), strippers 157 are provided to remove the sheets from the belt and direct them into the delivery station. The strippers 157 are slidably mounted to the top of vertical stop plate 158. In alignment with the strippers are side guides and joggers 159 and 160, guide 159 being securely fastened to rod or support 161, while guide 160 is adjustably secured to rod or support 162, said rods 161 and 162 being preferably square in cross section where they pass through openings 163 in delivery top frame 164, U-guides 165 preventing the rods 161 and 162 from turning. A back guide and jogger 166 is adjustably carried on rod 167, the ends of which are sleeved on side actuator rods 168, set screws 169 being provided to lock the rod 167 in adjusted position. Rods 168 are slidably carried by bearings 170 and terminate in angular projections 171 working in cam groove 172 on jogger cams 173 (see Figs. 31, 32 and 33), carried on shafts 173' suitably journaled in bearings 174' and kept from endwise movement by collar 174". The ends of rods 161 and 162 terminate in angular projections 174 working in cam track 175 on jogger cams 173, rotation of which will actuate rods 161, 162 and 168 to "jog" or agitate the guides and joggers 159, 160 and 166, maintaining the sheets 8 in an even pile. A top retainer 176 may be sleeved on rod 162 and extend through a slotted opening 166' in the back guide 166 to prevent sheets from floating out of the delivery station.

As the sheets reach the delivery station they are received on a delivery table 177 which is automatically lowered at a rate consistent with the reception of sheets thereon, the apparatus for this purpose being identical with that used in the feeder stations. In view of this similarity of parts and function prime numbers like those used in describing the feeder mechanism are used on the delivery mechanism, the operation of which will be understood from reference to the operation of the feeder mechanism, it being understood that in the feeder stations the feeder table rises and in the delivery station the delivery table falls.

*Air system*

In the handling of the sheets in my device the use of air suction and air blast is contemplated and toward this end I have provided a suitable pump 178 which is adapted to create air blast and air suction simultaneously. (See Figs. 1 to 5 and 34 to 36.) Suction and blast lines 179 and 180 connect the pump with a valve housing 181 having two inlet chambers 182 and 183 and four outlet chambers 184, 185, 186 and 187. Valves 188 are adapted to valve openings 189 between the inlet and outlet chambers, springs 190 normally urging the valves into closed position. Rocker arms 191, pivoted at 192 to valve housing extension 193 bear at one end against the valve stem 194 of the valve and at the other end through roller 195 on the cam surface 196 of the cam wheel 197, the cam wheels being secured to cam shaft 198. The cam surfaces 196 on the various cam wheels are of predetermined length and so timed as to open or close the valves at precisely the desired moment. Suction outlet or conduit 199 and blast conduit 199' lead from the valve chambers 184 and 187 to approximately midpoint on the intermediate rails 80, flexible conduits 200 and 201 continuing the lines 199 and 199' to the conduits 202 and 203, secured to the arm 86 of end frame 82, said last named conduits continuing upwardly to connect to the ends of longitudinal conduits 111 and 112 on the pickup carriage. Through this system of conduits air suction and air blast is provided for the pick up heads, the flexible conduits 200 and 201 assuring continuity during movement of the pick up carriage.

Conduit 204 from suction chamber 185 leads to housings 205 below the air suction openings 81 in the transfer table 3, said housings being interconnected by conduit 206.

Conduit 207 from blast chamber 186 leads to a longitudinal conduit 208 adjacent the top frame rail 78; and at approximately central position with respect to each feeder station a blast outlet 209 is provided, side flexible conductors 210 extending from the outlets 209 to the blast chambers 211 on the back stop members 40 in which the openings 57 are provided. The flexible conductors 210 allow free movement of the back stop members 40 during adjustment thereof. (See Fig. 34.)

A separate conduit 212 leads directly from the pump 178 to the longitudinal conduit 133 on the delivery belt side of the transfer table. The suction in this line is preferably less than that in the other conduits and is continuous. A flexible line or conduit 213 leads from the end of conduit 133 to a suction valve 214 mounted on the depending arm 87 of the end frame 83, the use and operation of said valve being hereinafter explained.

In the timing of the air suction and blast system, blast is provided through openings 209 and 57 at the feeder stations for a short interval to agitate the top few sheets during the pick up action by the suction cup 107. Suction is provided at the suction cups 107 when they drop onto the sheets on the feeder piles or on the transfer table preparatory to delivery to the transfer table or to the delivery belt, the suction continuing during the transfer of the sheet and until the moment of deposit at which time the suction ceases and a short blast of air is provided to positively release the sheet from the suction head. Suction is provided to the openings 81 in the transfer table as sheets are deposited thereon but suction is discontinued when the suction cups 107 drop to the transfer table to pick up the sheets.

Suction in the longitudinal conduit 133 is applied continuously and after the leading edge of the sheet 2 has passed over said conduit it seals the openings 137 in the sleeves 136. As aforesaid, the time and length of suction and blast is controlled by the cam wheels 197, however, since conduit 133 is connected directly to the pump through conduit 212 the suction will be continuous as long as the pump is running.

*Drive mechanism*

From the foregoing it will be seen that properly coordinated drive mechanism must be provided for conveying movement to the various parts. Toward this end I have provided a motor 215, driving shaft 216 through pulleys 217 and 218 and V-belt 219. The motor also drives the pump 178 through pulleys 220 and 221 and V-belt 222. See Figs. 1 to 5.

The shaft 216 is continuous, extending the full length of the machine, and is suitably journaled in bearings 223 and carries a flywheel 223'. Adjacent the center of the shaft 216 is a clutch comprising a driving section 224 rotatable with the shaft 216 and a driven section 225 which may be engaged and disengaged from driving section 224. The clutch section 225 carries a V-pulley 226 in which belt 227 rides to actuate pulley 228 on shaft 229 carried by bearing 230, a worm 231 being carried by the shaft 229 and engaging gear 232 mounted on shaft 233 between bearings 234 and 235. The top of shaft 233 (see Figs. 37 and 38), carries the sleeve 236 in which is slidably mounted the carriage drive bar lever 237, one end of which carries a transverse extension 238 having roller 239 adapted to ride the cam surface 240 in irregularly shaped cam member 241 which is integral with bearing 235 and nonrotatable. Keys 242 on shaft or lever 237 work in keygrooves 243 of sleeve 236 to keep said lever from rotating. The other end of lever 237 carries a headed roller 244 working in slot 245 of carriage connecting drive bar 92. The cam member 241 is so shaped as to impart a rapid return of the pickup carriage from the delivery belt deposit position. The sharp angular surface 246 of cam member 241 allows this rapid movement of the roller 239 and lever 237.

At the lower end of shaft 233 are bevel gears 247 and 248, gear 247 meshing with bevel gear 249 on shaft 250 journaled in bearings 251 and 252 and carrying the cam 33 which contacts the roller 32" on connecting rod 32, movement of which will actuate the levers 31 to cause the feeder table lift mechanism to function.

The other bevel gear 248 meshes with bevel gear 253 on shaft 254 held in bearings 255 and 256, a bevel gear 257 on the end of shaft 254 meshing with bevel gear 258 on cam shaft 198 supported in bearings 259 and 260. The end of cam shaft 198 carries the cam 33' which contacts roller 32' to actuate the lever 31', causing the delivery table drop mechanism to function.

A pulley 261 is carried by drive shaft 216, a V-belt 262 and pulley 263 driving shaft 264 in bearing 265, bevel gears 266 and 267 driving shaft 268 supported in bearings 269 and 270, a bevel gear 271 being secured to the top of shaft 268 and in mesh with bevel gear 272 on shaft 273 carrying delivery belt roller 128 in bearings 129. Shaft 273 carries worms 274 at each end, each worm engaging a gear 275 on shaft 276 in bearing 277, said shaft 276 carrying bevel gear 278 in mesh with bevel gear portion 173" of jogger cam 173.

The clutch comprises the sliding driving section 224 sliding on segments 279 which are pinned securely to the shaft 216 and spaced to provided slots or openings 280 in which the clutch arms 281 may operate, said arms being pivotally carried in openings 282 of the segments 279 by means of stub pins 283. Sliding member 224 has projections 284 therein which are adapted to contact the clutch arms 281 to move them into engaging position. The ends of the clutch arms carry rollers 285 adapted to contact inclined surface 286 of friction shoes 287 positioned in the driven clutch section 225, the roller 285 being positioned in the slot 288 of the shoes 287. A ring 289 bears against the shoes 287 and is normally urged toward the shoes by springs 290. A collar 291 on shaft 216 prevents endwise movement of the clutch section 225.

On the sliding driving clutch section 224, a circumferential groove 292 is provided with a split collar 292' working therein, a yoke 293 being pivotally secured to the collar 292' at 294, said yoke being adjustably carried by clutch rod 295.

The other end of the clutch rod 295 carries a sleeve 296 (see Figs. 43, 44 and 45), in which a short rod 297 may work. A spring 298 in normally inert position is secured to sleeve 296 and collar 299 on short rod 297, providing a resilient connection between the rod 295 and rod 297. The short rod 297 is slidably mounted in bracket 300 and bearing 301.

A clutch rod control lever 302 is adapted to impart endwise movement to the rod 297 by means of pin 303 on said rod 297, the pin riding in slot 304 of forked end 305 of said control lever 302. A compression spring 306 surrounds the rod 297 between the bearing 301 and the washer 307 abutting forked end 305 of the control lever, normally urging the clutch rod into disengaging position.

The clutch control lever 302 extends upwardly and is pivoted at 308 to bracket 309. (See Figs. 46, 47 and 48.) The upper end of the control lever carries an angular offset portion 310 adapted to abut pin 311 sliding in support 312 and secured to sliding head 313 which is slidably mounted on rods 314 secured to supports 312 and 315, springs 316 normally urging the head 313 and pin 311 into lever extension retaining position. A dog 317, pivotally carried by the sliding head 313 at 318, has a depending leg 319 adapted to contact stop 320. The face 321 of dog 317 may be contacted by plunger 322 on piston 323 positioned in suction valve 214, a spring 324 tending to urge the piston and plunger outwardly as shown. However, while there is suction in the valve chamber, this suction will be sufficient to overcome the compression of the spring 324 to keep the plunger withdrawn from dog engaging position. The valve chamber of the suction valve 214 is connected to the longitudinal suction conduit 133 on the transfer table 3 through flexible line 213. The suction openings in the longitudinal conduit 133 are normally covered by the sheet 2 which is passing thereover. Should a pick up member fail to pick up a sheet from the transfer table for delivery to the delivery belt the corresponding suction openings over which the sheet would normally pass are left open, resulting in a loss of suction. In the suction valve this loss of suction will result in elongation of the spring 324 causing the plunger 322 to eject into the path of the dog 317 which it will strike moving the head 313 on the rods 314, withdrawing the pin 311 from engagement with the lever extension 310, permitting the control lever 302 to move the rods 297 and 295 toward the clutch, disengaging same, whereupon the pick up carriage will stop as will the drives to the feeder and delivery cams, and to the valve cams.

Normal action of the suction valve is as follows: When the machine starts the plunger 322 is in extended position but is withdrawn as soon as the sheets cover the suction openings in the longitudinal suction conduit 133. After the sheets pass over this suction line and the suction openings are uncovered, the plunger is released and as the machine moves back to pick up position the plunger 322 strikes the dog 317, causing it to pivot until the plunger passes over it, at which time the dog will fall back into place.

The clutch may be engaged and the mechanism started by outward movement of the lever 325, pivoted at 326 and having angular portion 327 which carries a roller 328 adapted to engage inclined portion 329 of clutch rod control lever 302, forcing it back to clutch engaging position at which point the plunger 322 will be forced out into extension engaging position. A spring 330 will return lever 325 to normal position. (See Figs. 1 and 4.)

To manually disengage the clutch I have provided a push lever 331, non-rotatably sleeved in a support in a suitable manner on one of the standards 79, the end of said lever 331 having an offset end 332 positioned in alignment with and adapted to contact the extension or pin 333 on the sliding head 313 to force same rearwardly, allowing the clutch control lever 302 to swing to clutch release position. When lever 302 is manually forced back to clutch engaging position, the head 313 will force end 332 and lever 331 back to normal operating position.

Operation

While the illustrations show three feeder piles it is obvious that the machine may be any length within reason and a greater number of feeder piles may be provided so that a greater number of different sheets can be collated.

The sheets 2 are stacked on the feeder tables 11 which are manually adjusted by releasing the segments 13, the proper heighth of the table 11 being a point where the top sheet is adjacent the blast openings 57 in the back stop members 40. Prior to insertion of the sheets the back stop members are adjusted to accommodate the size sheets to be collated. This adjustment is accomplished by loosening lock nut 48 and turning crank 47 which will rotate the screw 43 on which the back stop members 40 are threaded. When proper adjustment is made the lock nut 48 is turned to secure the shaft 46. Front sheet stop fingers 59 are adjusted to sheet contact position. The automatic lift adjustment is made by setting the detent 38 in the proper notch in the member 34 which will cause the cam surface 35 to act on the pin 37 of pawl 28 at a predetermined moment causing a certain amount of rotation of ratchet wheel 27 and worm 25, gears 24, 22 and 21, the last gears 21 being on screw shafts 14 on which the movable table 11 is threadedly mounted.

At the time the sheets are supplied to the feeding stations, the delivery station is similarly prepared, the table 177 being manually raised to a proper height to receive the sheets, the table dropping mechanism being so adjusted to drop the table at a rate equal to the sum of the rise of all the feeder tables being used, since the delivery table receives in consecutive order sheets from each of the feeder stations.

The strippers 157, side and rear guides and joggers 159, 160 and 166 are adjusted to fit the size sheet being collated. The auxiliary hold down members 151 are also adjusted on their supporting rods 154.

The pickup members 4 on the pick up carriage 5 and the actuating means therefor, are also adjusted on the rocker arm actuator bar 95, rocker arm supports 91 and pick up head support 90, so that the pick up heads will grasp the sheets at the proper place, which is preferably at the corners of said sheets.

When all the adjustments are made according to the size of the sheet being collated and the feeder stations are supplied with sheets, the motor 215 is started and the clutch on shaft 216 is set at engaging position. The feeder carriage 5 will move toward the feeder stations and the rollers 119 will contact cams 126, raising the push rods 94 and depressing the pick up suction cups 107 through the medium of the rocker arms 100, the suction cups being forced downwardly until they contact the top sheet 2 in the feeder stations. Air blast through openings 51 has loosened up the top few sheets and suction is applied to the suction cups 107 holding the sheet securely thereto. The pick up carriage drive bar lever 237 with one end riding in cam 240, being rotatably driven, now starts the pickup carriage toward the delivery belt side of the machine. The rollers 119 will drop from cams 126 and the pickup suction cups with the sheets attached will raise and travel with the carriage away from the feeder stations.

It is obvious that when the machine is first started there are no sheets lying on the transfer table to be carried to the delivery belt. After the first half cycle of operation however, there has been a sheet transferred from each of the feeder stations to the transfer table 3, where the sheets are held in place by suction applied through openings 81. Therefore, after the first half cycle of operation has been completed, when one set of pick up members 4 are lowered to pick up sheets from the feeder stations, the other set of pick up members will be depressed to pick up the sheets from the transfer table for delivery to the delivery belt. The suction in the transfer table will be discontinued when the suction in the pickup suction cup has started.

As sheets are being taken to the transfer table from the feeder piles, sheets from the transfer table are carried to the moving delivery belt 6. As the sheets drag over the longitudinal suction conduit 133 paralleling the transfer table between it and the delivery belt, the sheets are held taut and kept from dragging on the moving delivery belt until ready for deposit. At this point, should the pick up suction cups fail to lift a sheet the suction openings in the conduit 133 would remain open causing a loss of suction and releasing plunger 322 on suction valve 214 to indirectly disengage clutch on shaft 216 as hereinbefore explained.

Before the sheets can be deposited on the delivery belt it is necessary to move the hold down tape 140 out of engagemnt with the belt. As the pick up head support 90 moves toward the far edge of the delivery belt, the rollers 149 contact the inclined surface 147 on rocker arm 142, raising these arms and consequently the hold down tape pulleys 141 to raise the hold down tape 140 from the delivery belt. Further horizontal movement of the rollers 149 causes them to engage the stop or hook 148 terminating the upward movement of the tape but starting a horizontal movement thereof, as the sliding heads 143 move against the springs 146 on the rods 144, to entirely remove the hold down tape up and away from the delivery belt. At this moment the rollers 119 contact cams 126 and the suction cups drop, depositing the sheets on the delivery belt, the suction in the cups ceasing, a short sharp blast of air being emitted from said cups to assure release of the sheet.

At this point the carriage drive bar lever 237 with its roller 239 reaches the sharp angular surface 246 of cam member 241, and the pick up carriage is rapidly withdrawn from above the delivery belt, the hold down tape just as rapidly dropping onto the sheets on the delivery belt.

The sheets will pass under the auxiliary hold downs 151 and through openings 78' to be removed by strippers 157 and guided and positioned in an even pile on the delivery table 177 by guides and joggers 159, 160 and 166. The delivery belt runs at a speed sufficient to clear the belt of all sheets thereon before the next batch of sheets is deposited.

From the foregoing it will be seen that I have provided a collating or sheet assembling machine which automatically picks up sheets from feeder supplies or stations, carries them simultaneously to a transfer table and thence to a delivery belt for delivery to an assembly station where the sheets are gathered one on top of the other in regular consecutive order preparatory to binding or the like. The process is rapid and free from errors caused by the human element. Failure in sheet transfer has been provided for by an automatic clutch releasing mechanism.

It is obvious that many changes in form, proportion and details of construction may be resorted to without departing from the spirit of my invention and I therefore reserve all rights to any changes which come within the scope of the principles covered by this specification and the following claims.

What I claim as new and desire to secure by Letters Patent is:

1. In an automatic collator of the class described, a plurality of sheet feeders, a delivery means adapted to indirectly receive sheets from the feeders, a sheet receiver for collecting the sheets from the delivery means, a sheet hold down tape normally riding on the delivery means for retaining the sheets in fixed relation thereto, and means for moving said hold down tape away from the delivery means during deposit of sheets thereon.

2. In a device of the class described, sheet pick-up means including supports and an actuating means, pick up heads adjustably carried by the supports and connected to the actuating means, whereby said heads may be adjusted to the size sheets being collated, and are operable simultaneously.

3. The structure as specified in claim 2, said heads having a pick up suction shoe, a body sleeve member, suction shoe supporting means sleeved in the body member, conduit means for supplying air blast and suction to the shoe and means normally urging the shoe into raised position.

4. In a device of the class described including a delivery belt, a hold down tape carried at the ends thereof by rollers, said rollers being rockably and slidably mounted, whereby the tape may be moved from its belt contacting position during deposit of sheets on said belt and means normally urging the hold down tape into belt engaging position.

5. In a device of the class described including a reciprocable pick up carriage, a driving mechanism therefor including an irregularly shaped cam member, a rotatable sleeve member, a sliding lever carried by the sleeve member rotatable therewith and adapted to drive the pick up carriage, one end of the sliding lever contacting the irregularly shaped cam surface of the cam member whereby the speed of movement of the pick up carriage may be increased or decreased according to the shape of the cam surface.

6. In an automatic collator of the class described, a plurality of sheet feeders, a delivery means adapted to indirectly receive sheets from the feeders, a transfer table intermediate the feeders and the delivery means, said transfer table being adapted to receive sheets from the feeders for transfer to the delivery means, means for transferring sheets from the feeders to the transfer table and from the transfer table to the delivery means, and a sheet receiver for collecting the sheets from the delivery means.

7. In an automatic collator of the class described, a plurality of sheet feeders, a delivery means adapted to indirectly receive sheets from the feeders, a transfer table disposed along and intermediate the feeders and the delivery means, said transfer table being adapted to receive sheets from the feeders for transfer to the delivery means, means for transferring sheets from the feeders to the transfer table and from the transfer table to the delivery means, and a sheet receiver for collecting the sheets from the delivery means.

8. In an automatic collator of the class described, a plurality of sheet feeders, a delivery means adapted to indirectly receive sheets from the feeders, a transfer table intermediate the feeders and the delivery means, said transfer table being adapted to receive sheets from the feeders for transfer to the delivery means, sheet pickup means for transferring sheets from the feeders to the transfer table and from the transfer table to the delivery means, and a sheet receiver for collecting the sheets from the delivery means.

9. In an automatic collator of the class described, a plurality of sheet feeders, a delivery means adapted to indirectly receive sheets from the feeders, a transfer table intermediate the feeders and the delivery means, said transfer table being adapted to receive sheets from the feeders for transfer to the delivery means, means for simultaneously transferring sheets from the feeders to the transfer table and from the transfer table to the delivery means, and a sheet receiver for collecting the sheets from the delivery means.

10. In an automatic collator of the class described, a plurality of sheet feeders, a delivery means adapted to indirectly receive sheets from the feeders, a transfer table adapted to receive sheets from the feeders for transfer to the delivery means, sheet pickup means for simultaneously transferring a sheet from each of the feeders to the transfer table and additional means adapted to simultaneously transfer the sheets previously deposited on the transfer table to the delivery means, and a sheet receiver for collecting the sheets from the delivery means.

11. In an automatic collator of the class described, a column of sheet feeders, a transfer table disposed along the sheet feeders, a delivery means disposed parallel to the transfer table, sheet transfer means movable transversely of the transfer table and adapted to transfer sheets from the sheet feeders to the transfer table and from the transfer table to the delivery means.

12. In an automatic collator of the class described, a column of sheet feeders, a transfer table disposed along the sheet feeders, a delivery means disposed parallel to the transfer table, sheet transfer means movable transversely of the transfer table and adapted to simultaneously transfer sheets from the sheet feeders to the transfer table and from the transfer table to the delivery means.

13. In an automatic collator of the class described, a column of sheet feeders, a transfer table disposed along the sheet feeders, a delivery means disposed parallel to the transfer table, two sets of sheet transfer means movable transversely of the transfer table, one set of said sheet transfer means being adapted to transfer sheets from the sheet feeders to the transfer table and the other set of sheet transfer means being adapted to transfer sheets from the transfer table to the delivery means.

14. In an automatic collator of the class described, a column of sheet feeders, a transfer table disposed along the sheet feeders, a delivery means disposed parallel to the transfer table, two sets of sheet transfer means movable transversely of the transfer table, one set of said sheet transfer means being adapted to transfer sheets from the sheet feeders to the transfer table and the other set of sheet transfer means being adapted to transfer sheets from the transfer table to the delivery means, and a common means for simultaneously actuating both sets of transfer means.

15. In an automatic collator of the class described employing aligning sheet feeders, a transfer table and a delivery means, a transversely reciprocating sheet transfer means adapted to transfer sheets from the feeders to the transfer table and from the transfer table to the delivery means, said sheet transfer means including a plurality of sheet pickup heads, means connected to the heads for holding the sheets thereto, and means for rendering the last mentioned means operative and inoperative for predetermined periods of time.

16. In an automatic collator of the class described, a column of sheet feeders, a transfer table disposed along the sheet feeders, a delivery means disposed parallel to the transfer table, sheet transfer means including a transversely reciprocable carriage, pickup heads carried by the carriage and adapted to pick up, carry and deposit sheets from the feeders to the transfer table and from the transfer table to the delivery means.

17. In an automatic collator of the class described, a column of sheet feeders, a transfer table disposed along the sheet feeders, a delivery means disposed along the transfer table, sheet transfer means adapted to transfer sheets from the feeders to the transfer table and from the transfer table to the delivery means, a sheet holddown means normally riding on the delivery means for retaining the sheets in fixed relation thereto, and means for moving said holddown means into and out of sheet retaining position.

18. In an automatic collator of the class described, a column of sheet feeders, a transfer table disposed along the sheet feeders, a delivery means disposed along the transfer table, sheet transfer means adapted to transfer sheets from the feeders to the transfer table and from the transfer table to the delivery means, a sheet holddown means normally riding on the delivery means for retaining the sheets in fixed relation thereto, and means actuated by the sheet transfer means for moving said holddown means into and out of sheet retaining position.

19. In an automatic collator, the combination of a plurality of sheet feeders, a delivery means adapted to indirectly receive sheets from the feeders, a transfer table intermediate the sheet feeders and the delivery means and adapted to receive sheets from the feeders, means for transferring the sheets deposited on the transfer table to the delivery means, driving mechanism for the collator, a clutch in the driving mechanism, suction means connected to the transfer table and engageable by the sheets being collated, clutch disengaging means connected to the suction means and operable upon failure of a sheet being deposited on the transfer table from the feeders.

20. In an automatic collator, the combination of a plurality of sheet feeders, a delivery means adapted to indirectly receive sheets from the feeders, a transfer table intermediate the sheet feeders and the delivery means and adapted to receive sheets from the feeders, means for transferring the sheets deposited on the transfer table to the delivery means, driving mechanism for the collator, a clutch in the driving mechanism, a suction conduit intermediate the transfer table and the delivery means and in the path of sheets being transferred to said delivery means, suction means connected to the transfer table and the suction conduit and engageable by the sheets being collated, clutch disengaging means connected to the suction means and operable upon failure of a sheet being deposited on the transfer table from the feeders or from the transfer table to the delivery means.

21. In an automatic collator, the combination of a plurality of sheet feeders, a delivery means, a transfer table intermediate the feeders and the delivery means, sheet transfer means adapted to transfer sheets from the feeders to the transfer table and from the transfer table to the delivery means, said transfer means including a transversely reciprocating carriage, sheet pickup heads on the carriage, and means for moving the heads into sheet pickup or deposit position at predetermined moments.

22. In an automatic collator, the combination of a plurality of sheet feeders, a delivery means, a transfer table intermediate the feeders and the delivery means, sheet transfer means adapted to transfer sheets from the feeders to the transfer table and from the transfer table to the delivery means, said transfer means including a transversely reciprocating carriage, driving mechanism for the collator, a clutch in the driving mechanism, clutch disengaging means, suction means having openings adapted to be covered by the sheets during their passage from the feeders to the delivery means, a suction actuated member carried by the reciprocating carriage and adapted to contact the clutch disengaging means but normally in non-contacting relation therewith, said suction actuated member being adapted to move into contacting relation with clutch disengaging means upon failure of a sheet to cross the suction means.

23. The structure as specified in claim 1, including rollers carrying said holddown tape, said last named means including pivot arms carrying each roller, a slidably mounted support for each pivot arm, and means for rocking said arm to raise the tape from the delivery means before movement of the slidable support, the arm rocking means upon further movement being adapted to move the slidable support endwise to move the tape transversely of the delivery means, and means for returning the tape to holddown position.

24. The structure as specified in claim 1, including means for limiting the upward movement of the tape, means for limiting the transverse movement of the tape, and means for returning the tape to holddown position.

25. In a device of the class described, sheet pickup means including pickup heads, one or more supports each carrying a plurality of said heads, a common means for simultaneously actuating all the heads on the supports, said actuating means and heads being adjustable to the size sheets being collated.

26. In a device of the class described, sheet pickup means including a carriage, a plurality of pickup heads, one or more supports on the carriage adjustably carrying the pickup heads, pickup head actuating means, one or more supports on the carriage adjustably carrying the pickup head actuating means, whereby said pickup heads and actuating means may be adjusted to the size sheets being collated.

27. In a device of the class described including a reciprocable pickup carriage, carriage reciprocating means comprising a rotatable member, a crank arm sleeved in the rotatable member and slidably pivoted to the carriage, and means for controlling the movement of the crank arm in the rotatable member whereby predetermined speeds of movements will be imparted to the pickup carriage.

28. In an automatic collator of the class described including sheet feeding means and sheet receiving means, sheet aligning means comprising adjustable supports, aligner guides adjustably carried by the supports, aligners vertically movable in the guides, and means for retaining the aligners in fixed or movable relation to the guides.

29. In an automatic collator of the class described including sheet feeding means and sheet receiving means, sheet aligning means comprising adjustable supports, aligner guides adjustably carried by the supports, aligners vertically movable in the guides, means for retaining the aligners in fixed or movable relation to the guides, and a resilient member in each of the aligners adapted to contact the top sheet of the sheets being aligned.

30. In an automatic collator of the class described having air suction and blast means, sheet pickup members each comprising a fixed guide, a shoe support slidably carried by the guide, a shoe carried by said support, means normally urging said shoe into raised position with respect to the guide, said shoe support comprising a pair of conduits, one of which is connected to the suction means and the other connected to the blast means, means for applying suction to the shoe at predetermined moments, and means for stopping the suction and applying blast to the shoe at the moment of sheet deposit.

LLOYD L. WEST.